US009720179B2

(12) United States Patent
Amit et al.

(10) Patent No.: US 9,720,179 B2
(45) Date of Patent: Aug. 1, 2017

(54) MULTICHANNEL OPTICAL TRANSMITTER AND METHOD OF ALIGNING COMPONENTS IN THE SAME

(71) Applicant: SOURCE PHOTONICS (CHENGDU) CO., LTD., Sichuan (CN)

(72) Inventors: Moshe Amit, Los Angeles, CA (US); Mark Heimbuch, Chatsworth, CA (US)

(73) Assignee: Source Photonics, Inc., Chatsworth, CA (US)

( * ) Notice: Subject to any disclaimer, the term of this patent is extended or adjusted under 35 U.S.C. 154(b) by 0 days.

(21) Appl. No.: 14/000,160

(22) PCT Filed: Jul. 29, 2013

(86) PCT No.: PCT/CN2013/080284
§ 371 (c)(1),
(2) Date: Aug. 16, 2013

(87) PCT Pub. No.: WO2015/013853
PCT Pub. Date: Feb. 5, 2015

(65) Prior Publication Data
US 2016/0131843 A1 May 12, 2016

Related U.S. Application Data

(60) Provisional application No. 61/801,363, filed on Mar. 15, 2013.

(51) Int. Cl.
*G02B 6/293* (2006.01)
*H04B 10/50* (2013.01)
(Continued)

(52) U.S. Cl.
CPC ........... *G02B 6/2938* (2013.01); *G02B 6/262* (2013.01); *G02B 6/2706* (2013.01);
(Continued)

(58) Field of Classification Search
CPC .... G02B 6/1006; G02B 6/262; G02B 6/2706; G02B 6/293; G02B 6/2938; G02B 6/4213;
(Continued)

(56) References Cited

U.S. PATENT DOCUMENTS 5,212,707 A * 5/1993 Heidel ................. G02B 6/4249
359/569
9,042,731 B2  5/2015 Kurokawa et al.
(Continued)

FOREIGN PATENT DOCUMENTS

CH   201210535318.0 A   6/2013
CN        103163594 A   6/2013

OTHER PUBLICATIONS

Munetaka Kurokawa, Yasushi Fujimura, and Kazunori Tanaka; "Optical Module Having a Plurality of Optical Sources"; Bibliographic Data of CN103163594 (A); Jun. 19, 2013; http://worldwide.espacenet.com.

(Continued)

*Primary Examiner* — Akm Enayet Ullah
*Assistant Examiner* — Michael Mooney
(74) *Attorney, Agent, or Firm* — Andrew D. Fortney; Central California IP Group, P.C.

(57) ABSTRACT

An optical multiplexer and methods of making and calibrating the same are disclosed. A method of aligning components in a multichannel optical/optoelectronic transmitter includes passively fixing a plurality of light emitters in place on a substrate; adjusting positions of a first lens passing light from a first light emitter and an optical signal transmission medium receiving the light from the first light emitter until a far field spot of the light from the first light emitter is at or near an end of the transmission medium; fixing one or more optical subassemblies on the substrate; and adjusting posi- (Continued)

tions of the optical subassembly(ies) to align light from the remaining light emitters with the far field spot. Some embodiments include multiple optical subassemblies, each including a lens and a filter. Other embodiments include one optical subassembly including a mirror and a beam combiner.

21 Claims, 6 Drawing Sheets

(51) Int. Cl.
    *G02B 6/26*     (2006.01)
    *G02B 6/42*     (2006.01)
    *G02B 6/27*     (2006.01)
    *G02B 27/10*     (2006.01)

(52) U.S. Cl.
    CPC ....... *G02B 6/4221* (2013.01); *G02B 27/1006* (2013.01); *H04B 10/501* (2013.01); *G02B 6/293* (2013.01)

(58) Field of Classification Search
    CPC .... G02B 6/4215; G02B 6/4221; G02B 6/126; G02B 6/13; G02B 6/4201; G02B 6/4292; H04B 10/501; H04B 10/506; H04J 14/02; H04J 14/06
    USPC .................................. 385/88–92; 398/65, 91
    See application file for complete search history.

(56) References Cited

U.S. PATENT DOCUMENTS

2012/0189306 A1    7/2012   Du et al.
2013/0148966 A1*  6/2013   Kurokawa .............. H04J 14/02
                                                          398/65

OTHER PUBLICATIONS

Office Action dated May 18, 2015 for Chinese Patent Application No. 201380001200.2; 6 pgs.; The State Intellectual Property Office of the P.R.C., People's Republic of China.

* cited by examiner

MULTICHANNEL OPTICAL TRANSMITTER AND METHOD OF ALIGNING COMPONENTS IN THE SAME

RELATED APPLICATIONS

This application claims the benefit of U.S. Provisional Patent Application No. 61/801,363, filed Mar. 15, 2013, incorporated herein by reference in its entirety. This application may also be related to International Application No. PCT/CN2013/071928, filed Feb. 27, 2013, and U.S. patent application Ser. No. 13/820,989, filed Mar. 5, 2013, each of which is incorporated herein by reference in its entirety.

FIELD OF THE INVENTION

The present invention generally relates to the field of optical and optoelectronic devices.

DISCUSSION OF THE BACKGROUND

Optical transmitters are devices that send optical signals over optical signal transmission media in optical and optoelectronic networks. Typically, an optical transmitter is included with optical receiver in an optical transceiver. Recently, multi-channel optical transceivers have been made to communicate multiple signals over a single transmission medium.

Multiple wavelength division multiplexing (WDM) has been used for optical interfaces for data rates at 40 Gbps (e.g., 40 GBASE LR4 and ER4) and 100 Gbps (e.g., 100 GBASE LR4 and ER4). The IEEE 802.3ba-2010 standard defines four WDM channels multiplexed onto a single fiber for these interfaces. The 40 GBASE-LR4/ER4 interface defines CWDM grids with center wavelengths of 1271, 1291, 1311, and 1331 nm. The 100GBASE-LR4/ER4 interface defines LAN-WDM channels with center wavelengths of 1295.56, 1300.05, 1304.58, and 1309.14 nm.

For various reasons, it is important, if not critical, to fabricate compact, low cost optical subassemblies (OSAs) for use in such transceivers. Thus, there is demand for ever-smaller optical devices, particularly in multi-channel optical transmitters and transceivers.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a free space, multichannel optical transmitter (which may transmit collimated or polarized light or light signals), and methods for aligning components in such an optical or optoelectronic transmitter (e.g., an optical signal transmitter or transceiver, such as a transceiver for a fiber optic network). The present invention advantageously provides optimal alignment in a free space, multichannel optical transmitter, and provides the transmitter with a reduced package size.

In one aspect, the present invention relates to a method of aligning components in a multichannel optical or optoelectronic transmitter, comprising passively fixing a plurality of light emitters in place on a substrate; adjusting positions of (i) a first lens through which light passes from a first one of the plurality of light emitters and (ii) an optical signal transmission medium receiving the light from the first one of the plurality of light emitters until a far field spot of the light from the first one of the plurality of light emitters is at or near an end of the optical signal transmission medium; passively fixing one or more subassemblies of optical components on the substrate; and adjusting positions of lens(es) and filter(s) (in the subassembly[ies] or independent of the subassembly[ies]) to align the light from the remaining light emitters with the far field spot. In general, the optical signal transmission medium comprises an optical fiber. The present method enjoys particular advantage when the light from each light emitter is collimated or polarized.

In many embodiments, the present method further includes mounting or fixing an output lens between the end of the optical signal transmission medium and the optical component nearest thereto, and afterwards, aligning the optical signal transmission medium. The optical component nearest to the output lens, in many cases, will be an optical component that combines the light or light signals from all of the light emitters.

Some embodiments include a plurality of subassemblies, each including a corresponding lens and a filter receiving light from a remaining one of the light emitters, and a lens-and-filter mount on which the corresponding lens and the filter are mounted or fixed. Other embodiments include one subassembly that includes a polarization beam combiner (PBC) and a mirror.

In various embodiments, passively fixing the plurality of light emitters comprises adhering the plurality of light emitters onto a circuit board or optical platform in predetermined locations. In other or further embodiments, adjusting positions of the corresponding lens(es) and the filter(s) further includes adjusting a position of the lens-and-filter mount. Prior to use in the present method, one or more of the subassemblies may be pre-assembled. The corresponding lens and the filter in the pre-assembled subassemblies may have an angle accuracy of ≤0.2°, for example. In general (although not always), the method further comprises placing the components into a housing.

In further embodiments, the lens-and-filter mount comprises a flat metal piece on which the lens and filter are directly or indirectly placed. The flat metal piece generally has a larger area than the combined bottom surfaces of the corresponding lens and the filter, although this is not always the case. In some embodiments of the method where the lens-and-filter mount comprises a flat metal piece, fixing the subassemblies on the substrate further comprises depositing or applying an adhesion-promoting plating on the lens-and-filter mount (generally onto an underside of the flat metal piece prior to placing the flat metal piece or the lens-and-filter mount onto the substrate).

In some embodiments of the method, a plurality of subassemblies (e.g., three subassemblies) are fixed on the substrate. Some of these embodiments further comprise clamping the subassemblies to the substrate while fixing the subassemblies on the substrate. Fixing the subassemblies on the substrate may comprise applying an adhesive to the subassemblies and/or the substrate, contacting the subassemblies to the substrate, and curing the adhesive. In one example, the adhesive comprises an epoxy.

In a further aspect, the present invention relates to a multichannel optical or optoelectronic transmitter, comprising a plurality of light emitters; one or more subassemblies of optical components (e.g., passive optical components); and an output lens, filter, isolator and/or collimator receiving light from each of the light emitters, after passing through at least one of the lenses and either passing through or being reflected by a component on at least one of the subassemblies. In some embodiments, each subassembly comprises a lens-and-filter mount, a lens on the lens-and-filter mount, and a filter on the lens-and-filter mount. Each of the subassemblies is also configured to permit alignment of the light from each of the light emitters with a common far field spot location using the corresponding components on the subassembly(ies) (e.g., the lens, filter, and/or lens-and-filter mount). In a typical example, each of the light emitters comprises a laser diode. In general, the present transmitter includes n light emitters and n−1 subassemblies, where n is an integer of at least 3 (e.g., 4).

In various embodiments of the present transmitter, each of the lens-and-filter mounts comprises a flat sub-mount and a plurality of substantially vertical projections therefrom. The vertical projections are configured to secure the lens and provide a mounting surface for the filter. The flat sub-mount may comprise a flat metal piece having at least one dimension (i) substantially equal to the width of the lens and the width of each of a first two of the substantially vertical projections on opposed sides of the lens and/or (ii) greater than the width of the filter and less than the width of the filter and the width of each of a second two of the substantially vertical projections at opposed sides of the filter. In such embodiments, the first two substantially vertical projections and the second two substantially vertical projections may share a common substantially vertical projection. In other or further embodiments, the common substantially vertical projection may have first and substantially vertical surfaces that share a beveled edge.

In many examples of the present transmitter, the lens and the filter are at an angle of about 45° with respect to each other. Additionally or alternatively, the first light emitter and the corresponding first lens are linearly aligned (or aligned at a 180° angle) with the common far field spot location.

In various examples, the light from the first light emitter passes through (i) a first filter in the first subassembly that reflects light from a second light emitter and (ii) a second filter in the second subassembly that reflects light from a third light emitter. In further embodiments, the light from the second light emitter passes through a second lens in the first subassembly before being reflected by the first filter, and the light from the third light emitter passes through a third lens in the second subassembly before being reflected by the third filter. In one such example, the second filter is aligned at about a 90° angle with respect to the first filter. In even further embodiments, the light from the first light emitter further passes through a third filter in a third subassembly that reflects light from a fourth light emitter, and the light from the fourth light emitter passes through a fourth lens in the third subassembly before being reflected by the third filter. In such an example, the third filter may be aligned at about a 90° angle with respect to the second filter.

Alternative embodiments of the present transmitter further comprise a plurality of polarization beam splitters, receiving light from (i) the first light emitter and a second light emitter through corresponding lenses and (ii) third and fourth light emitters reflected by a mirror; a plurality of isolators receiving light from the plurality of polarization beam splitters; a first waveplate on a first one of the plurality of isolators, the first waveplate rotating light from a first polarization beam splitter in a first direction; and/or a second waveplate on a second one of the plurality of isolators, the second waveplate rotating light from a second polarization beam splitter in a second direction opposite to the first direction. In some of these embodiments, each isolator is oriented at an angle between 0° and 22.5° relative to the light from the polarization beam splitter. Additionally or alternatively, the first waveplate may comprise a first quarter waveplate and a first half waveplate that rotates the light from the first polarization beam splitter by either 0° or 90°; and/or the second waveplate comprises a second quarter waveplate and a second half waveplate that rotates the light from the second polarization beam splitter by the other of 0°- and 90°.

In further embodiments, the present transmitter further comprises a plurality of monitors, each monitor being configured to receive a portion of the light from a corresponding light emitter. For example, each of the monitors may comprise a back-facet monitor.

The substrate in the present transmitter generally comprises a board or platform on which the light emitters and the subassemblies are mounted. The transmitter may also further comprise (i) a housing surrounding the board or platform, the plurality of light emitters, the plurality of subassemblies, and the output lens, filter, isolator and/or collimator, and/or (ii) a connector configured to receive an optical fiber. As with the present method, the common far field spot location may be at or near an end of the optical fiber in the connector.

The present multichannel transmitter and methods of making and using the same enjoy particular advantage when the light from each light emitter is collimated and/or polarized. The present invention further enables alignment of optical components in free space in a multichannel transmitter, while maintaining power to the multichannel transmitter during the alignment. These and other advantages of the present invention will become readily apparent from the detailed description of exemplary embodiments below.

BRIEF DESCRIPTION OF THE DRAWINGS

FIG. 1B is a cross-sectional view of the transmitter of FIG. 1A, taken along a lateral bisection of the transmitter.

DETAILED DESCRIPTION

Figure 1A:
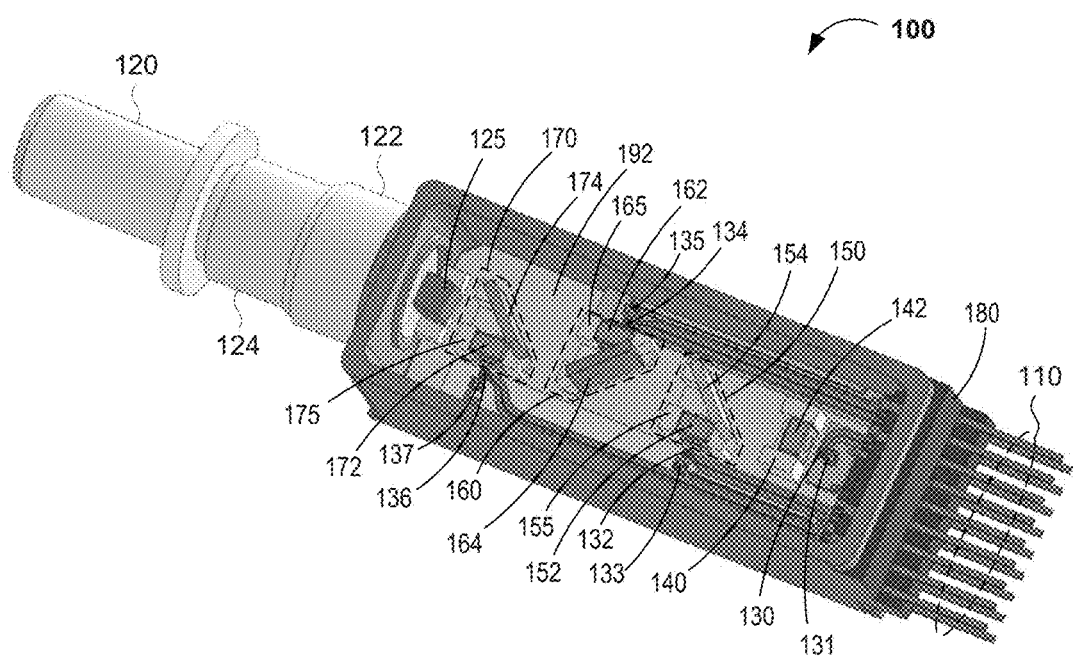
FIGS. 1A-B are diagrams showing an exemplary 40G-compliant optoelectronic transmitter (e.g., a transmitter optical subassembly, or TOSA) in a sealed housing fitted with a connector for receiving an optical fiber.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. In addition, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Also, the terms "optical" and "optoelectronic" are generally used interchangeably herein, and use of either of these terms also includes the other, unless the context clearly indicates otherwise. Similarly, for convenience and simplicity, the terms "optical device" and "optoelectronic device," as well as the terms "transmitter," "transceiver," "optical transmitter" and "optical transceiver," may be used interchangeably unless the context clearly indicates otherwise, but these terms are generally given their art-recognized meanings herein. The term "transceiver" generally refers to a device having at least one receiver and at least one transmitter. Furthermore, the terms "placing," "securing," "affixing," "adhering," "mounting" and "attaching" are generally used interchangeably herein, and use of one such term generally includes the others, but these terms are generally given their art-recognized meanings.

Embodiments of the present invention advantageously provide an apparatus and method of making and calibrating an optical transmitter that combines three or more optical signals for transmission over a single fiber. Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

Exemplary Aligned Components in an Optical or Optoelectronic Transmitter

In general, components in a multi-channel optical or optoelectronic device (e.g., an optical transmitter or transceiver, etc.) may be aligned to accommodate various optical path(s). Each optical signal in an optical path may have a unique center wavelength corresponding to a channel of a multichannel optical communication system or network. In general, the center wavelength of each of the optical signals may differ from the other center wavelengths by about 4.5 nm or more. The various channels can be distinguished from each other by wavelength (e.g., a difference of at least 20 Å, 40 Å, 80 Å, 4 nm, 20 nm, etc.), frequency (e.g., a difference of at least 5 Hz, 10 Hz, 20 Hz, 50 Hz, etc.), data transmission rate, or a combination thereof. Also, each optical signal in a multi-channel optical or optoelectronic transmitter may have one of a plurality of polarization types (e.g., s-polarization or p-polarization).

Optical components in an optical path of a channel can include light emitters, lenses, filters, beam splitters, isolators, and/or mirrors. In a typical case, the optical path of a transmitter channel includes at least a light emitter, a lens, and a filter, beam splitter, or mirror. Some optical paths include a light emitter, a plurality of lenses, and a plurality of filters. Other optical paths include a light emitter, one or more lenses, a beam splitter, a beam combiner, an isolator, and one or more mirrors. One or more (and generally all) such optical components may be aligned for a given optical path such that a far field spot of the light from the light emitter corresponding to the optical path is at or near an end of an optical fiber that is coupled to an output of the optoelectronic transmitter.

Embodiments of the present invention relate to a free space, multichannel optical transmitter that may transmit collimated or polarized light or light signals. In addition, particular embodiments relate to a multichannel optical or optoelectronic transmitter having a plurality of light emitters (e.g., laser diodes), one or more subassemblies of passive optical components, an output lens, an output filter or beam combiner, one or more isolators and/or one or more collimators. The output lens, output filter, isolator(s) and/or collimator(s) can receive light from one or more of the light emitters, optionally after the light has passed through at least one of the lenses and is either passed through or reflected by at least one filter (e.g., a wavelength-selective filter, a dichroic mirror, an output coupler, etc.) or beam splitter. Each subassembly can include a lens and filter on a mount, or a mirror and a beam combiner. Each subassembly may permit alignment of the light from each light emitter with a common far field spot location using the corresponding passive optical components therein (e.g., the lens, filter, and/or lens-and-filter mount, or the mirror and/or beam combiner).

An Exemplary 40G-Compliant Multichannel Optical Transmitter

In one embodiment, a multichannel 40G-compliant optical or optoelectronic transmitter can include a plurality of light emitters; a plurality of subassemblies; and an output lens, filter, isolator and/or collimator receiving light from each of the light emitters, after passing through at least one of the lenses and either passing through or being reflected by at least one of the filters. Each subassembly can include a lens-and-filter mount, a lens on the lens-and-filter mount, and a filter on the lens-and-filter mount. Each of the subassemblies is also configured to permit alignment of the light from each of the light emitters with a common far field spot location using the corresponding lens, filter, and lens-and-filter mount. In a typical example, each of the light emitters includes a laser diode. In general, the present 40G-compliant transmitter includes n light emitters and n−1 subassemblies, where n is an integer of at least 3 (e.g., 4).

Each subassembly that includes a plurality of passive optical components can include a lens, a filter, and a lens-and-filter mount on which the lens and the filter are mounted or fixed. In exemplary 40G-compliant transmitters, the lens receives light from a corresponding light emitter, and the filter receives (and typically reflects) focused light from the lens. The filter also receives (and typically passes through) light from at least one other light emitter. An alternative optical subassembly can include a lens and a lens holder, although such an optical subassembly does not include a plurality of passive optical components.

Further, the present transmitter can include a fixed output lens, or other output component, between the end of the optical signal transmission medium and the optical subassembly nearest thereto. An optical transmission medium (e.g., an optical fiber) can be aligned to the output component upon connection to an output of the transmitter. The present 40G-compliant transmitter enjoys particular advantage when the light from each light emitter is collimated. Collimated light may be in the form of parallel rays that generally do not substantially disperse with distance as the light propagates.

Figure 1B:
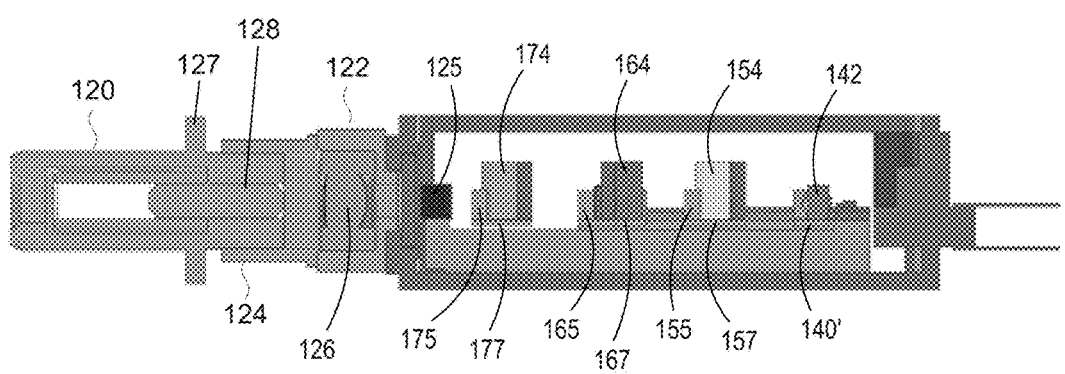

FIGS. 1A-B show a diagram 100 of an exemplary 40G-compliant optoelectronic transmitter, and in particular, a transmitter optical subassembly, or TOSA, in a sealed housing fitted with a connector 120 for receiving an optical fiber (not shown). The present optoelectronic transmitter may also be utilized in dense WDM (DWDM) applications.

In FIG. 1A, optical subassemblies 150, 160 and 170 can be aligned with light emitters 130, 132, 134 and 136. Channels in the transmitter 100 may be defined by the center wavelength of light emitted by the light emitters 130, 132, 134 and 136. Each of the light emitters 130, 132, 134 and 136 may comprise a laser diode, although any source of polarized light pulses may be used (e.g., a pulsed edge- or surface-emitting laser diode, a distributed feedback laser [DFB], an electro-modulated laser [EML], etc.). For example, light beams from the light emitters 130, 132, 134 and 136 may be pulsed at a rate of from 1 kHz to 25 GHz, or any value or range of values therein. The light emitted by the light emitters 130, 132, 134 and 136 may be polarized, but not necessarily with the same polarization type (e.g., one or more light emitters may have s-polarization, while one or more other light emitters may have p-polarization). The center wavelengths of light emitted by the light emitters 130, 132, 134 and 136 may be from about 400 nm to about 3000 nm in length, and may have a minimum difference of about 0.4 nm, 0.8 nm, 4.5 nm, 10 nm, 20 nm, or any other value of at least about 0.4 nm (and up to about 100 nm) from the other center wavelengths of light emitted by the other light emitters.

In particular embodiments, optical output signals from each light emitter and optical subassembly can be coupled to a single optical fiber. For example, an optical fiber can connect to the housing 180 via a connector 120, and the light from the light emitters can be focused at or near an end of the optical fiber in an alignment process. The connector 120 couples to a fiber receptacle 124, which may house a fiber stop 128 (FIG. 1B). Fiber receptacle 124 connects to a lens holder 122, which houses an output lens 126 that focuses the light output by the transmitter 100.

In one example of such an alignment process, a far field spot of the light from a light emitter may be at or near an end of the optical fiber to indicate that particular light emitter, as well as associated subassemblies (e.g., each including a lens and a filter) are in substantial alignment. Similar procedures can be performed on other light emitters, subassemblies, and/or other optical components, so that the optical path for each channel of the transmitter can be so aligned. Once the light from one or more light emitters (e.g., all of the light emitters) is aligned with the far field spot, the welding ring 127 is irradiated with radiation from a conventional laser welder to seal or fix the connector 120 to the fiber receptacle 124.

Housing 180 can include a housing or package (e.g., a quad [4-channel]small form-factor pluggable [QSFP] package) that encases optical components on an optical platform or board 192. The light emitters can be implemented as integrated circuits or chips, and can include laser diodes and/or light-emitting diodes (LEDs). As such, light emitters may also be referred to as "light emitter chips" or "laser diodes" herein. The light emitter chips 130, 132, 134 and 136 may be passively fixed in place, such as by gluing them onto circuit board or optical platform 192 in predetermined locations. As shown more clearly in FIG. 1B, the locations on the circuit board or optical platform 192 at which the light emitter chips 130, 132, 134 and 136 are placed may be raised.

The optical fiber inserted into the connector 120 and an optical subassembly (e.g., subassembly 170) can be aligned to couple light from one of the light emitters (e.g., light emitter 136) to the optical fiber. The remaining light emitters (e.g., 134, 132 and 130) may also be aligned using corresponding subassemblies 160, 150 and 140 to couple the light from the remaining light emitters to the optical fiber at connector 120. Before or after aligning some or all of the remaining light emitters 134, 132 and 130 with the optical fiber and/or the far field spot, the first optical subassembly can be permanently fixed to the substrate (e.g., by curing or irradiating the adhesive between the lens-and-filter mount 175 to the substrate 192).

In one example, one or more of the lens-and-filter subassemblies 150, 160 and 170 are pre-assembled with an accuracy of the angle between the lens and the filter (e.g., an angle accuracy) that is equal or less than 0.2°. This may also reduce the depth of field (DOF) to a minimal value, and simplify the alignment and/or enclosure process (e.g., finalizing the alignment and/or housing or package closing and/or alignment processes).

Filters (or beam splitters) 154, 164 and 174 may be or comprise a wavelength-selective filter (e.g., a light filter that selectively allows light of a certain wavelength or wavelength range to pass through or to be reflected, while other wavelengths are reflected or passed through, respectively, or absorbed or scattered, as the case may be). For example, any of filters 154, 164 and 174 may include an edge filter, an output coupler or a dichroic mirror that reflects light having a relatively long wavelength, while passing through light having a relatively short wavelength. Alternatively, any of filters 154, 164 and 174 may reflect light having a relatively short wavelength, while passing through light having a relatively long wavelength. Alternatively or additionally, one or more of the filters 154, 164 and 174 may reflect light having a first polarization type (e.g., s-polarization) and allow light having a second polarization type (e.g., p-polarization) to pass through, while remaining ones of the filters 154, 164 and 174 reflect light having the second polarization type and allow light having the first polarization type to pass through. One or more filters 154, 164 and 174 can also be or comprise a 50/50 beam splitter, although there may be some incremental insertion loss when using a 50/50 beam splitter.

Each of the lens and filter subassemblies 150, 160 and 170 can include a flat-bottomed metal sub-mount, on which the lens and filter are directly or indirectly placed. For example, the lens-and-filter mount can include a flat metal piece on which the lens and filter are placed directly or indirectly. The flat metal piece generally has a larger area than the combined bottom surfaces of the corresponding lens and the filter, although this is not always the case. Fixing the subassemblies on the substrate (e.g., optical platform or board 192) can include depositing or applying an adhesion-promoting plating on the lens-and-filter mount. The metal sub-mount may be larger than the combined bottom surfaces of the lens and filter in order to increase the bonding area between the sub-mounts and optical platform 192.

In some cases, each of the lens-and-filter mounts can further include a plurality of vertical or substantially vertical (i.e., "(substantially) vertical") projections from the flat sub-mount. The (substantially) vertical projections may be configured to secure the lens and provide a mounting surface for the filter. The flat sub-mount may include a flat metal piece having at least one dimension that is substantially equal to the sum of (i) the width of the lens and (ii) the widths of each of a first two of the (substantially) vertical projections on opposed sides of the lens. Alternatively or additionally, the flat metal piece may have a dimension that is (1) greater than the width of the filter and (2) less than the sum of (i) the width of the filter and (ii) the widths of each of a second two of the (substantially) vertical projections at opposed sides of the filter. In such cases, the first two (substantially) vertical projections and the second two substantially vertical projections may share a common (substantially) vertical projection. The common (substantially) vertical projection may have vertical or substantially vertical surfaces that share a beveled edge.

This approach to making optical subassemblies may also increase the stability and strength of the optical components therein (e.g., the lenses 132, 134 and 136, and the filters 154, 164 and 174). In some cases, an adhesion-promoting plating may be applied or deposited on the metal sub-mounts. In this fashion, adhesion can be increased between the sub-mounts and the optical platform, board and/or package. For example, the adhesion-promoting plating may promote and/or increase the effectiveness and/or bond strength of an epoxy adhesive to one or both of the sub-mount and the optical platform 192.

In the particular example of FIG. 1A-B, the lens and the filter are at an angle of about 45° with respect to each other. However, other angles (e.g., 37°, 40°, 53°, 60°, etc.) between a lens and corresponding filter can also be supported in some cases. Additionally or alternatively, a first light emitter (e.g., 130) and a corresponding first lens (e.g., 142) may be linearly aligned (or aligned at a 180° angle) with the common far field spot location. The common far field spot location may be at or near an end of the optical fiber that is coupled to connector 120. Leads 110 can also be supplied to provide connections to electrical signals (input and output), such as to other circuitry (e.g., control circuitry).

A monitor (e.g., a back-facet monitor) may also be associated with each of the light emitters. For example, monitor 131 may correspond to light emitter 130, monitor 133 may correspond to light emitter 132, monitor 135 may correspond to light emitter 134, and monitor 137 may correspond to light emitter 136. Each monitor may be configured to receive a portion of the light from the corresponding light emitter. For example, a monitor or monitoring detector can include a photodiode optically coupled to the back side of the corresponding light emitter or laser diode. The monitor can detect a small part of the light (polarized or unpolarized) emitted from the laser diode, and may transmit a feedback signal to a bias controller (not shown) configured to provide a bias current or bias voltage to each of the light emitters. Alternatively, the monitor can receive a small amount of the optical signal output by a modulator associated with the corresponding light emitter by using a mirror that is substantially transparent to light having the wavelength of the optical signal emitted by the light emitter.

An Exemplary 100G-Compliant Multichannel Optical Transmitter

Figure 2:
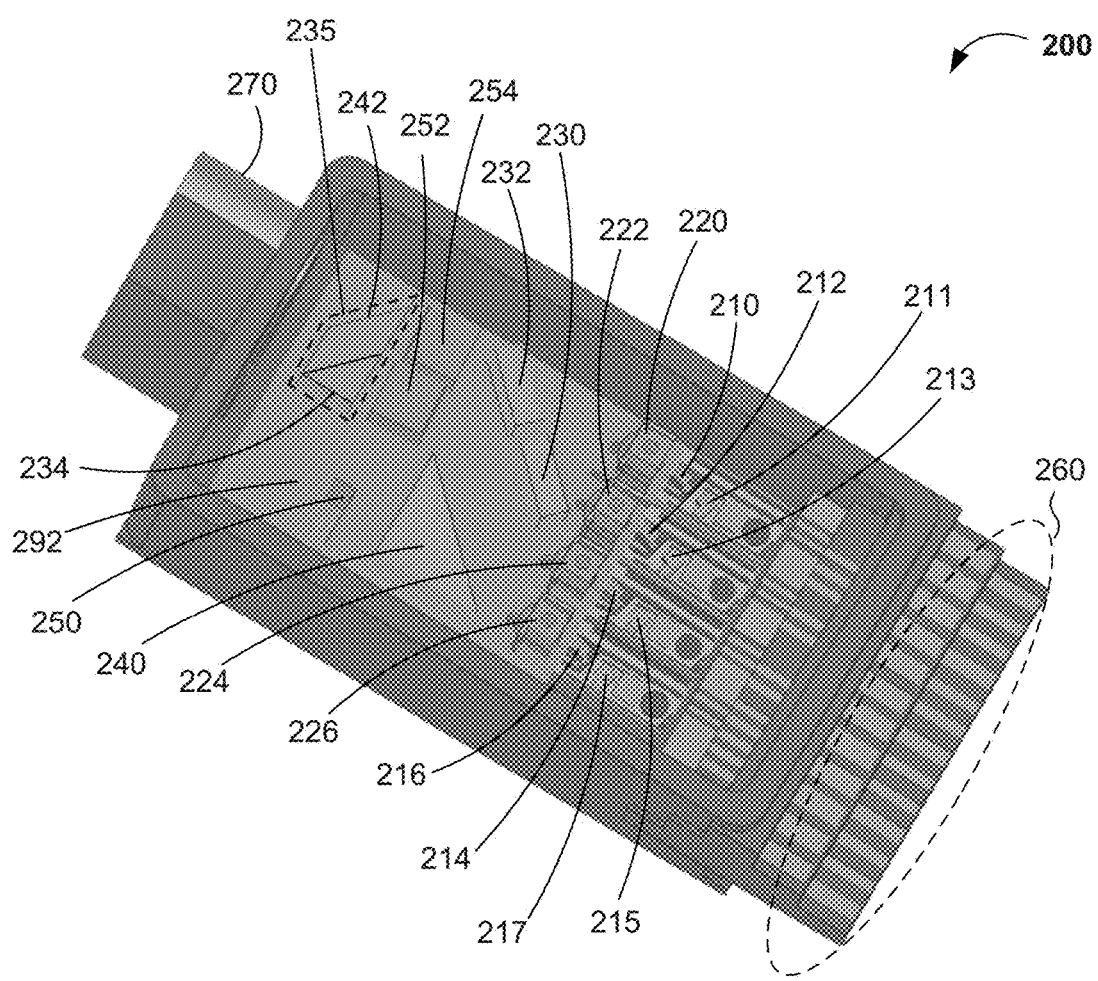
FIG. 2 is a diagram showing an exemplary 100G-compliant optoelectronic transmitter (e.g., a TOSA) in a sealed housing fitted with a connector for receiving an optical fiber.

FIG. 2 shows a diagram 200 of an exemplary 100G-compliant optoelectronic transmitter (e.g., a TOSA) in a sealed housing fitted with a connector for receiving an optical fiber. Similar to the 40G-compliant multichannel optoelectronic transmitter 100 of FIGS. 1A-B, channels in the exemplary 100G-compliant optoelectronic transmitter 200 of FIG. 2 may be defined by the center wavelength of light emitted by the light emitters 210, 212, 214 and 216. Similarly, any source of polarized light pulses may be used (e.g., a pulsed edge- or surface-emitting laser diode, a DFB, an EML, etc.) for the exemplary transmitter 200. Light signals from the light emitters 210, 212, 214 and 216 may be pulsed at a rate of from 1 kHz to 25 GHz, or any value or range of values therein. The light emitted by the light emitters 210, 212, 214 and 216 may be polarized, but not necessarily with the same polarization type (e.g., one or more light emitters may have s-polarization, while one or more other light emitters may have p-polarization). The center wavelengths of light emitted by the light emitters 210, 212, 214 and 216 may be from about 400 nm to about 3000 nm in length, and may have a minimum difference of about 0.4 nm, 0.8 nm, 4.5 nm, 10 nm, 20 nm, or any other value of at least about 0.4 nm (and up to about 100 nm) from the other center wavelengths of light emitted by the other light emitters. The transmitter 200 as shown in FIG. 2 emits and combines polarized and/or collimated light, but future designs (e.g., where the optical components are sufficiently small to reduce the length of the optical path between light focusing components) may emit and/or combine unpolarized and/or non-collimated light.

Multiple light emitters 210, 212, 214 and 216 may be coupled to a single optical fiber (e.g., in a connector attached to lens holder 270). The lens holder 270 can house an output lens that focuses the light from the transmitter 200 such that the far field spot is at or near the end of the optical fiber, and may also be coupled to a housing or package 280, which may have a window therein for viewing various components in/of the transmitter 200. In one embodiment, lens holder 270 is slightly off-center from the end of the transmitter housing. In addition, lens holder 270 may be proximate to an output stage component (e.g., a filter, beam combiner, isolator and/or collimator) for the optical fiber. Light emitter chips 210, 212, 214 and 216 may be fixed in place (e.g., with an adhesive) on a mounting surface on the optical board 292.

A given lens and one or more filters or beam splitters can be positioned to align light from a first light emitter with the optical fiber. In one example, the first light emitter and the lens(es) and filters or beam splitters in the longest optical path may be aligned first in this aspect of the invention. For example, referring to FIG. 2, a first light emitter 214 and corresponding lens 224 may be aligned with the optical fiber when a far field spot of the light from light emitter 214 is at or near an end of the optical fiber. In this case, light from light emitter 214 may pass through lens 224, reflect off mirror 240 and beam splitter 232, pass through optional isolator 254, then reflect off mirror 242 and polarization beam combiner (PBC) 234 before passing through an output lens in lens holder 270 prior to reaching the optical fiber. Except perhaps for the output lens in the lens holder 270, each of these components can positioned (e.g., moved away from or closer to the light emitter 214 or lens holder 270, or moved laterally [e.g., to the left or right] or angled [e.g., turned clockwise or counterclockwise] relative to the incoming optical path) prior to the light from light emitter 214 being considered to be aligned.

Other light emitters that emit light along different optical paths and/or through different combinations of optical components must also be aligned with the optical fiber (e.g., the far field spot). Thus, light from the remaining light emitters 210, 212 and 216 is also aligned through corresponding components in their respective optical paths. For example, light from a second light emitter having the second longest optical path (e.g., light emitter 216) is aligned with the far field spot at or near the end of the optical transmission medium by passing it through lens 226, reflecting it with mirror 240 and beam splitter 230, and passing it through isolator 252 and beam splitter 230 to direct the corresponding light signal to the transmission medium (e.g., optical fiber). The positions and/or reflection angles of the various optical components in the second optical path (optionally other than those already aligned in the alignment of the optical path of the first light emitter 214) may be adjusted to improve alignment of light from the second optical emitter 216. In this example, the mirror 240 is already aligned, and can be permanently fixed to the substrate before placing and/or aligning optical components in the second optical path of light from the second optical emitter 216. However, if the position and/or reflection angle of the mirror 240 is adjusted to align light from the second optical emitter 216 with the far field spot, then one may check the alignment of light from the first light emitter 214 and change the position and/or reflection angle of the mirror 240 again if necessary to re-align the light from the first light emitter 214 with the far field spot prior to permanently fixing the mirror 240 to the substrate.

Similarly, light from a third light emitter (e.g., light emitter 210) may be aligned with the far field spot at or near the end of the optical transmission medium by passing it through lens 220, beam splitter 232, and isolator 254, and reflecting it with mirror 242 and PBC 234 to direct the corresponding light signal to the optical fiber behind lens holder 270. The positions and/or reflection angles of the various optical components in this optical path (e.g., other than those already aligned in the alignment of the optical paths of the first and second light emitters 216 and 214) may be adjusted to improve alignment of light from the optical emitter 210. In this example, the beam splitter 232, isolator 254, and optical subassembly (mirror 242 and PBC 234) are already aligned, and can be permanently fixed to the substrate before placing and/or aligning optical components in the third optical path of light from the third optical emitter 210. As a result, by the time that light beams from the third and fourth light emitters 210 and 212 are to be aligned, all of the optical components on the optical board 292 may have been aligned except for lenses 220 and 222. However, if necessary, locations and/or angles of various optical components (e.g., lenses, filters, beam splitters, mirrors, light emitters, isolators, etc.) can be adjusted such that a far field spot of the light from the third and/or fourth light emitter is aligned with the optical fiber, then other components in affected optical paths can be adjusted to re-align the light in those paths.

Beam splitters 230 and 232 may be or comprise a wavelength-selective filter, similar to the filters in the transmitter 100 of FIG. 1A-B. For example, one or both of the beam splitters 230 and 232 may include an edge filter or a dichroic mirror that reflects light having a relatively long wavelength, while passing through light having a relatively short wavelength. Alternatively, one or both of the beam splitters 230 and 232 may reflect light having a relatively short wavelength, while passing through light having a relatively long wavelength. PBC 234 may be a conventional polarization beam combiner, which may be a wavelength selective, variable or coherent polarization beam combiner, and may function (generally in a different application) as a polarized light beam splitter. Alternatively or additionally, PBC may comprise a grating or other optical waveguide, a wavelength grating router Thus, one or more of the beam splitters 230 and 232 and PBC 234 may reflect light having a first polarization type (e.g., s-polarization) and allow light having a second polarization type (e.g., p-polarization) to pass through, while remaining ones of the beam splitters 230 and 232 and PBC 234 reflect light having the second polarization type and allow light having the first polarization type to pass through. One or more beam splitters 230 and 232 can also be or include a 50/50 beam splitter, although there may be some incremental insertion loss when using a 50/50 beam splitter.

In contrast, mirrors 240 and 242 may reflect the received light beam regardless of the wavelength of that beam. Also, to further improve the alignment capability of the optical paths from light emitters 214 and 216, mirror 240 may be replaced by two separate mirrors that separately reflect the light signals from light emitters 214 and 216. In embodiments in which mirror 240 consists of a single mirror, mirror 240 may be a unitary piece having a single mirrored surface. Although a triangular piece is shown, other two-dimensional top-down shapes (e.g., square, rectangular) providing a substantially flat mirrored surface for reflecting the light signals from light emitters 214 and 216 are suitable.

In embodiments in which mirror 240 (which reflects light from both light emitters 214 and 216) includes two mirrors, one mirror generally reflects light from light emitter 214, while the other independently reflects light from light emitter 216. The two mirrors may be mounted on a mirror mount having the same, or approximately the same, size and shape as mirror 240. In such a case, the two mirrors can be mounted and aligned separately and/or independently, and the two mirrors on the mirror mount can constitute another optical subassembly.

Similar to the optical subassemblies in FIG. 1A, the mirror and beam combiner subassembly (i.e., mirror 242 and PBC 234) may be pre-assembled with an angle accuracy that is equal or less than 0.2°. Similarly, beam splitters 230 and 232, isolators 252 and 254, and mirror 240 may be pre-mounted on optical platform 292, or otherwise pre-assembled, optionally with an angle accuracy that is equal or less than 0.2°. This can also reduce the DOF to a minimal value, and may simplify the product enclosure process (e.g., finalizing the alignment and/or housing or package closing and/or alignment processes).

Optical isolators (or optical diodes) 252 and 254 are optical components that allow transmission of light in only one direction, and may be used to prevent unwanted feedback into a laser cavity. Thus, optical isolators 252 and 254 may be or comprise polarization dependent isolators, Faraday isolators, etc. In one embodiment using polarized light and a polarization beam combiner 234, one of the isolators 252 and 254 may further comprise a half waveplate configured to output a polarized beam having a polarization angle of 0° (e.g., isolator 252), and the other one of the isolators 252 and 254 (e.g., isolator 254) may further comprise a half waveplate configured to output a polarized beam having a polarization angle of 90°. Use of half waveplates with the isolators 252 and 254 enables use of a conventional polarization beam splitter as the beam combiner 234.

For example, a first half waveplate configured to output a beam having a polarization angle of 0° may be glued onto the surface of first isolator 252 closest to the connector 270, and a second half waveplate configured to output a beam having a polarization angle of 90° may be glued onto the surface of second isolator 252 closest to the connector 270. Alternatively, one of the isolators 252 and 254 may further comprise a quarter waveplate configured to rotate the polarized light by 45°, and the other one of the isolators 252 and 254 may further comprise a quarter waveplate configured to rotate the polarized light by −45°, thereby avoiding the potential loss of half of the light intensity or power at the beam splitter 234, Thus, in one implementation, each of the isolators 252 and 254 is further equipped with a quarter waveplate and a half waveplate, but such that the polarization angles of the beams output by isolators 252 and 254 differ by 90°. Such combinations of passive optical components (e.g., an isolator with a half waveplate and optional quarter waveplate glued thereon) can also be considered to be an optical subassembly in the context of the present invention.

Alternatively, to avoid use of quarter waveplates and/or half waveplates, optical isolators 252 and 254 may be or comprise polarization independent isolators, but this solution is less than ideal due to the size and cost of polarization independent isolators. Also, in a further alternative, optical isolators 252 and 254 may be replaced with a single half waveplate (e.g., in the path of light emitted by light emitter 210 and focused by lens 220).

The mirror and beam combiner subassembly 235, beam splitters 230 and 232, isolators 252 and 254, and/or mirror 240 can be clamped to optical platform 292 using alignment and/or positioning tools for accuracy and stability during adhesive (e.g., epoxy) curing. For example, a computer-controlled optical alignment apparatus can be employed for accurate positioning of optical components. Generally, the more tightly the components are held to the optical platform 292 (up to the point of risking damage to the optical platform 292, the submount[s], or the lens[es] or beam splitter[s]), the better the results.

In various embodiments, one or more of the lenses 220, 222, 224 and/or 226 may be pre-assembled or pre-adhered to a corresponding lens holder (e.g., not shown in FIG. 2, but which may be similar to lens holder 140 in FIG. 1A). In other or further embodiments, the lenses 220, 222, 224 and/or 226 may be secured (e.g., adhered or epoxied) to the corresponding holder with one or more surface structures that prevent the adhesive (e.g., epoxy) from spreading to neighboring lenses and/or lens holders. Such embodiments allow for independent curing processes to be performed for each lens and/or lens holder.

In the present transmitter, multiple light emitters (e.g., 210, 212, 214 and 216) may be coupled to a single fiber, where the light emitters 210, 212, 214 and 216 can be passively fixed in place on the optical board or substrate 292. Thereafter, the lenses, beam splitters, and mirrors (including beam combiner and mirror subassembly 235) may be adjusted to align (and optionally, to collimate) the light from each light emitter 210, 212, 214 and 216 with the transmission medium (e.g., the optical fiber). Optionally, the optical isolators 252 and 254 can also be positioned to align the light from the light emitters 210, 212, 214 and 216. As discussed above, alignment of the lenses, beam splitters, mirrors, and optical subassembly(ies) can occur such that all light emitters have the same, or substantially the same, far field spot size and angle. The far field spot size and angle can be considered at or near an end (e.g., a far end) of an optical fiber.

A thermistor 250 can also be included in the exemplary transmitter 200. A thermistor is a type of resistor with a resistance that varies with temperature (e.g., in a temperature range of from about −90° C. to about 130° C.) more than in standard resistors. Thermistors, generally comprising or formed from a ceramic or polymer, may be used as inrush current limiters, temperature sensors, self-resetting overcurrent protectors, and/or self-regulating heating elements. Also, pads or leads 260 can provide connections to internal or external electrical signals (e.g., input and output signals), such as to and/or from an external controller, or to and/or from external host circuitry.

In addition, in a manner similar to that of FIG. 1A, a monitor (e.g., a back-facet monitor) may also be associated with each of the light emitters. For example, monitor 211 may monitor or detect light from light emitter 210, monitor 213 may monitor or detect light from light emitter 212, monitor 215 may monitor or detect light from light emitter 214, and monitor 217 may monitor or detect light from light emitter 216. Each monitor may be configured to receive a portion of the light from the corresponding light emitter, and may include a photodiode optically coupled to the back side of the corresponding light emitter or laser diode. The monitor can detect a small part of the light (polarized or unpolarized) emitted from the light emitter, and may transmit a feedback signal (e.g., to a bias controller, not shown). Alternatively, the monitor can receive a small amount of the optical signal output by a modulator associated with the corresponding light emitter by using a mirror that is substantially transparent to light having the wavelength of the optical signal.

Exemplary Methods of Aligning Components in an Optical Transmitter

In general, components in a multi-channel optical or optoelectronic device (e.g., an optical transmitter or transceiver) may be aligned by aligning components in the optical path of a first channel, then aligning components in the optical path(s) of the remaining channel(s). Each optical signal in an optical path may have a unique center wavelength corresponding to a channel of a multichannel optical communication system or network. In general, the center wavelength of each of the optical signals may differ from the other center wavelengths by about 4.5 nm or more. Optical components in an optical path of a channel can include light emitters, lenses, beam splitters, a beam combiner. Isolators, waveplates and/or mirrors, as discussed above. One or more optical components may be aligned for a given optical path, such that a far field spot of the light from a given light emitter is at or near an end of an optical fiber that receives the output of the light emitters in the optoelectronic transmitter.

One important result of the present invention is the ability to align optical components in free space in a multichannel transmitter, while maintaining power to the multichannel transmitter during alignment. Thus, metal traces or wires may be formed on the substrate for electrical signal paths (e.g., to and from the light emitters, the monitors, a thermoelectric cooler 250, etc.) and optionally, the light emitters can be mounted or passively fixed in predetermined locations on the substrate and wirebonded to designated metal traces or wires, before any passive optical components are placed on the substrate.

The optical components may be aligned on a per channel or per light path basis. The various channels can be distinguished from each other as discussed herein (e.g., by wavelength, frequency, data transmission rate, a combination thereof, etc.). Embodiments of the present invention relate to methods of aligning components in a multichannel optical or optoelectronic transmitter (e.g., an optical signal transmitter or transceiver for a fiber optic network). The present invention advantageously provides optimal alignment in a free space, multichannel optical transmitter, and enables alignment of passive optical components while electrical power is provided to the transmitter.

Exemplary Methods of Making an Optical Transmitter and Aligning Optical Components in an Optical Transmitter In one embodiment, a method of aligning components in a multichannel optical or optoelectronic transmitter includes passively fixing a plurality of light emitters in place on a substrate; passively fixing one or more optical subassemblies in predetermined locations on the substrate, wherein each optical subassembly (ii) comprises a plurality of passive optical components; (i) receives light from at least two of the plurality of light emitters and (ii) comprises a plurality of passive optical components; passively fixing one or more additional passive optical components in predetermined locations on the substrate (e.g., in the optical paths of light from the plurality of light emitters); and adjusting a position and/or angle of a first one of the one or more optical subassemblies and any additional passive optical components through which light passes from a first one of the plurality of light emitters until a far field spot of the light from the first light emitter is at or near an end of an optical signal transmission medium; and adjusting positions of any remaining optical subassemblies and additional passive optical components to align the light from the remaining light emitters with the far field spot. In various embodiments, placing the optical subassembly(ies) on the substrate comprises passively fixing the optical subassembly(ies) in predetermined locations on the substrate, and optionally clamping the optical subassembly(ies) on the substrate while aligning the optical subassembly(ies) and/or other passive optical components.

Figure 3:
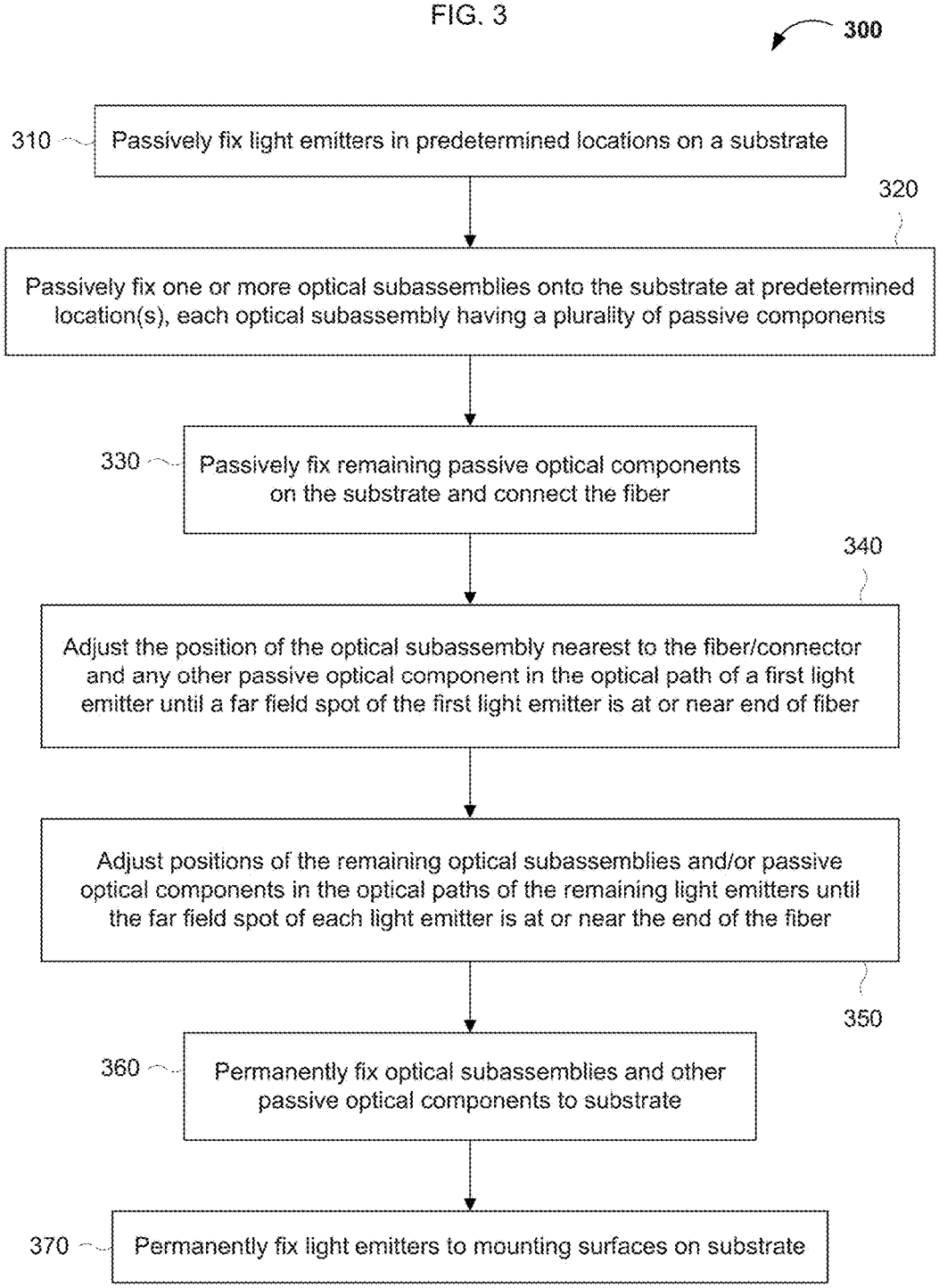
FIG. 3 is a flow chart for an exemplary method of making an optoelectronic transmitter in accordance with embodiments of the present invention.

FIG. 3 shows a flow chart 300 illustrating an exemplary method of making an optoelectronic transmitter in accordance with embodiments of the present invention. At 310, a plurality of light emitters can be placed, secured, affixed, adhered, mounted or attached in or to predetermined locations on the substrate. In the described examples, four light emitters are used, but the number can be more (e.g., 6, 8, 10, 12, 16 or more) or less (e.g., 2 or 3). In general, one light emitter is placed in a location along a straight line with the input to (e.g., an optical axis of) an optical transmission medium, such as an optical fiber, and any output lens and/or collimator along the straight line, adjacent to a connector for the optical fiber. In one embodiment, the remaining light emitters are placed on the substrate on adjacent sides of the optical axis between the first light emitter and the optical transmission medium (see, e.g., FIG. 1A). In another embodiment, the remaining light emitters are placed on the substrate on adjacent sides of the first light emitter, such that the initial optical paths from each of the light emitters are parallel (see, e.g., FIG. 2). Naturally, the light emitters can be placed on the substrate in any sequence.

The light emitters (e.g., light emitter chips) may be passively fixed in place, such as with an uncured adhesive. Also, positioning tools (see, e.g., forceps or tweezers 190 in FIG. 4) can be utilized for temporarily placing, grasping and/or clamping the light emitters and/or adjusting the positions of the light emitters (and eventually, other optical components, such as filters, beam splitters, lenses, optical subassemblies, etc.). However, light emitters are typical placed on the substrate using automated placing equipment. The light emitters are also generally wire-bonded to metal traces on the substrate that control the light signal output by each light emitter (e.g., on/off, power, bias, etc.). Alternatively, after aligning all components in the optical path between the first light emitter to be aligned and the optical transmission medium, the remaining light emitters may be placed and wire-bonded. In addition, an output collimator 125 may be passively fixed on the substrate or optical platform 192 near lens holder 122, adjacent to the connector 120.

Referring back to FIG. 3, at 320, one or more optical subassemblies can be placed or passively fixed onto the substrate, each at a predetermined location. Each subassembly may have a plurality of passive optical components fixed to or mounted on a mounting surface. In one embodiment suitable for a 40G-compliant optical transmitter, a plurality of optical subassemblies, each configured to combine two or more optical signals, are placed along an optical axis between the optical transmission medium and the light emitter that is along a straight line with the input to the optical transmission medium (see FIGS. 1 and 4). The lens-and-holder subassembly 140/142 may also be an optical subassembly in the context of the present disclosure, but it includes only a single passive optical component (i.e., lens 142). In another embodiment suitable for a 100G-compliant optical transmitter, an optical subassembly (e.g., mirror and PBC subassembly 235) configured to combine a plurality of optical signals (each of which may be polarized) is placed near an input to the optical transmission medium (see FIG. 2). Also, one or more of the optical subassemblies may be pre-assembled, and the corresponding components in the pre-assembled subassemblies (e.g., a lens and filter) may have an angle accuracy ≤0.2°.

At 330 in FIG. 3, any remaining passive optical components are passively fixed onto the substrate, and the optical fiber is connected to the transmitter. The remaining passive optical components may include an output collimator, one or more lenses (generally corresponding to a unique light emitter), a plurality of beam splitters or other light filters, a plurality of isolators, and/or one or more mirrors. The steps of passively fixing remaining passive optical components onto the substrate and connecting the optical fiber may be performed in any order or sequence. In various embodiments, passively fixing the remaining optical components can include adhering the optical component(s) onto a circuit board or optical platform 192 in predetermined locations. The various optical components may be placed into a housing that partially or fully encloses and protects the components as they are being placed and aligned on the substrate. The housing is generally pre-formed, and may include a molded plastic housing, a stamped metal housing with an insulating liner therein or thereon, etc., configured to enable placement of the various optical components in the housing. At the end of the manufacturing process, the open end or open side of the housing may be sealed with a further component of the housing (e.g., the missing end or side, the fiber connector and output lens housing, etc.). For example, referring to the embodiment of FIG. 1A, the housing may have an opening exposing the mounting surface(s) of the substrate 192, and the opening can be sealed with a thin plate or a transparent or opaque window after all of the components have been placed and aligned.

In this example, it is not necessary to place certain components in the TOSA housing in a particular order, although for logistical reasons, it may be beneficial to place the passive optical components in their locations temporarily (e.g., using a curable, but uncured, adhesive), adjust the locations during optical signal alignment (e.g., as described herein), then permanently fix the final, aligned locations of the components by curing the adhesive (e.g., using UV irradiation). Thus, at 340, the exemplary method may further include adjusting one or more locations of one or more additional passive optical components to align the various optical signals (e.g., the first and second optical signals with the first target), then permanently fixing the locations and positions of the components when all signals are aligned (e.g., the multichannel optical signal is aligned with the second target).

For example, as shown in FIG. 2, first through fourth lenses 220-226 can be placed on the substrate or optical platform 292 proximate to and in front of the first through fourth light emitters 210-216. Filters or beam splitters 230-232 can be placed on the substrate or optical platform 292 in substantial planar alignment with each other, with filter/beam splitter 230 proximate to and in front of the lens 222. Mirror 240 can be placed on the substrate or optical platform 292 in front of the third and fourth lenses 224-226, with the reflective surface of the mirror 240 facing the third and fourth lenses 224-226, and a nearest corner of the mirror 240 proximate to an outermost vertical edge of the fourth lens 226. Isolators 252-254 can be placed on the substrate or optical platform 292 in front of the filters/beam splitters 230-232, with an outermost vertical edge of the isolator 254 proximate to an outermost vertical edge of the filter/beam splitter 232. An output lens (not shown) can be placed in the lens holder 270 prior to attachment of the fiber (not shown). Therefore, at 340 in FIG. 3, the optical fiber may be connected at a connector (e.g., substantially similar or the same as connector 120, FIGS. 1A-B) attached to a lens holder (e.g., substantially similar or the same as lens holder 122 [FIGS. 1A-B] or 270 FIG. 2]). The positions of the lenses, filters, beam splitters, mirror(s), and isolators placed on the substrate may be adjustable prior to being fixed in their final positions.

Referring back to FIG. 3, at 340, the position of the optical subassembly closest to the optical fiber can be adjusted until the far field spot of light from the first light emitter to be aligned is at or near the end of the fiber. Adjusting the position of the optical subassembly can include adjusting a position of a lens-and-filter mount, or alternatively or additionally, positions of the corresponding lens and/or filter (see FIG. 1A). Alternatively, adjusting the position of the optical subassembly can include adjusting the position of a mirror-and-polarization beam combiner subassembly 235 (e.g., see FIG. 2). The position of the optical subassembly may be adjusted either manually or using automated place-and-position equipment (not shown).

Figure 4:
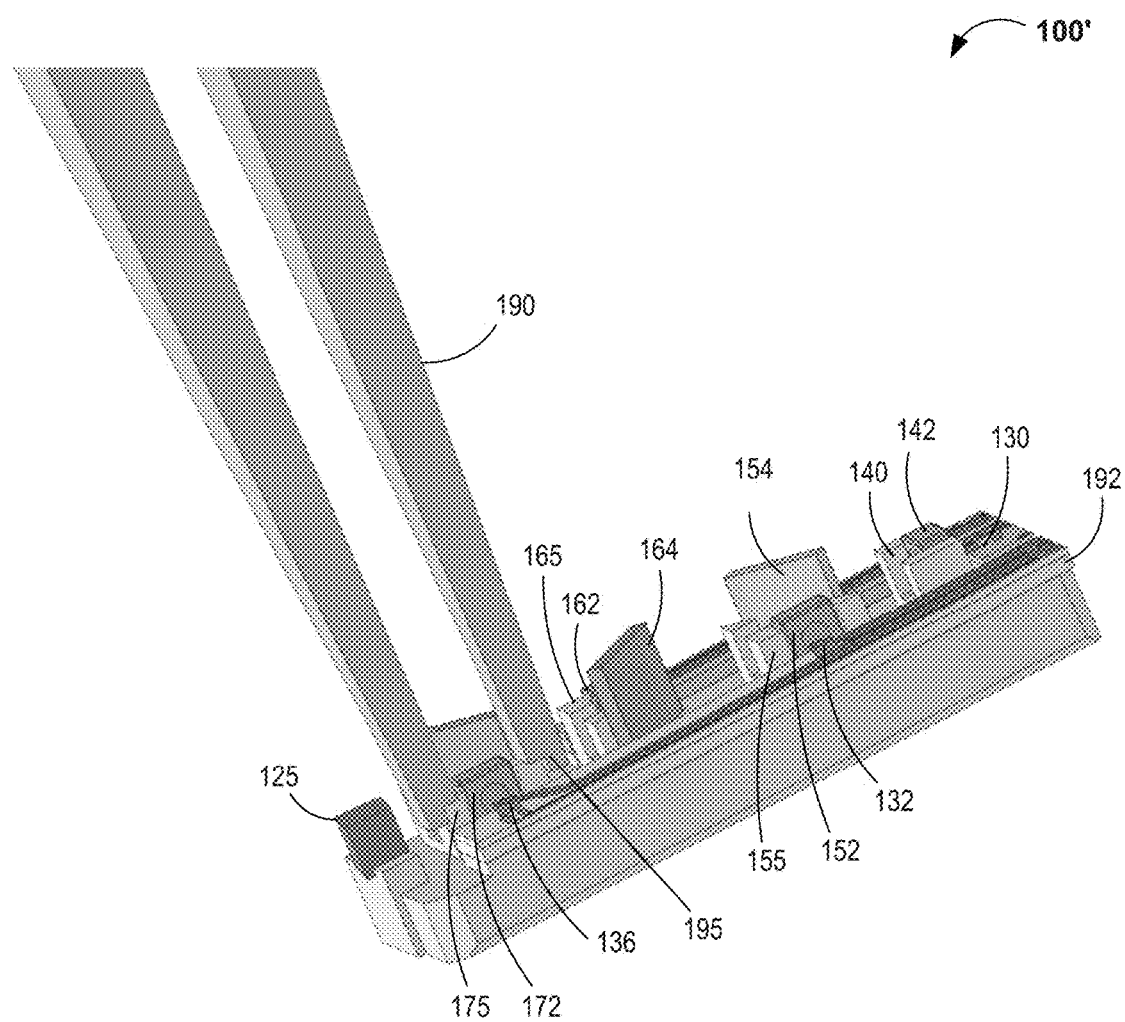
FIG. 4 is a diagram showing the exemplary optoelectronic transmitter of FIGS. 1A-B, without the housing or connector, in which an optical component is aligned in accordance with embodiments of the present invention.

FIG. 4 shows a diagram 100' of the exemplary optoelectronic transmitter of FIGS. 1A-B, without the housing or connector, in which a component is aligned in accordance with embodiments of the present invention. In these examples, three optical subassemblies (e.g., 150, 160 and 170) are passively fixed on the substrate 192. In some cases, the subassemblies may be temporarily clamped to the substrate during an alignment process, or while the subassemblies are being fixed on the substrate. For example, the subassemblies may be fixed on the substrate by applying an adhesive (e.g., an epoxy) to the subassemblies and/or the substrate, contacting the subassemblies to the substrate, and curing the adhesive.

In order to temporarily clamp or to adjust the position of an optical component (e.g., an optical subassembly, lens, filter, light emitter, etc.), a positioning tool 190 can be utilized. Positioning tool 190 can include tweezers, forceps or extended arms, fingers or pincers for grasping an optical component and adjusting its position, and can have a cut-out (e.g., a step-like indentation 195) on one or more inner surfaces thereof configured to mate with two or more surfaces of the optical subassembly (e.g., upper and side surfaces of the vertical projections in the lens-and-filter mount). For example, positioning tool 190 may be operable manually and/or under machine- or computer control. Computer or machine-based control can allow for precise positioning of optical components on substrate or platform 192.

The lens and filter subassemblies 150, 160 and 170 may be clamped to the optical platform by alignment/positioning tools (e.g., using automated or manual machine-controlled tweezers or forceps 190) for accuracy and stability during adhesive (e.g., epoxy) curing. At least one commercially available optical alignment apparatus may be capable of such functionality. Alternatively, optical alignment equipment can be modified by one skilled in the art to do so. The more tightly the sub-mounts are held to the optical platform 192 (up to the point of risking damage to the optical platform 192, the submount[s], or the lens[es] or filter[s]), the better the results.

In order to determine the far field spot on a lens, a far field beam profiler may be used to profile the beam at the focus of the first lens. The spot size may be approximately $f\lambda/D$, where f is the focal length of the lens, $\lambda$ is the wavelength of the light, and D is the diameter of the collimated beam incident upon the lens. Other suitable procedures can also be used for determining a far field spot that is at or near an end of the optical fiber coupled at the connector (e.g., connector 120 in FIG. 1A).

As shown in FIGS. 1 and 4, multiple transmitters or light emitters (e.g., 130, 132, 134 and 136) may be coupled to a single optical fiber that connects to connector 120. Light emitter chips 130, 132, 134 and 136 may be passively fixed in place on the board 192, then the lens and filter subassemblies can be adjusted to align the light from each light emitter, such that all light emitters have the same far field spot position, size and/or angle. Alternatively, the lens and filter subassemblies can be adjusted to collimate the light from each light emitter to form parallel beams. In the case of collimated light, the light emitters may have proximate and parallel far field spot sizes. In any event, the positions of the light emitters, lens-and-filter subassemblies, etc., may be adjustable such that a same or substantially the same far field spot size occurs at or near an end of the optical fiber.

Alternatively, final alignment may be performed by aligning the optical fiber after adding an output stage component 125 (e.g., an output lens, low-pass or high-pass filter, isolator and/or collimator). For example, if the lens-and-filter subassemblies (e.g., FIG. 1A-B) are adjusted to focus collimated light from each light emitter, output stage component 125 may include an output collimator and/or isolator. A collimator is a device that narrows a beam of particles or waves to further align or parallelize the light beam, or to cause the spatial cross section of the beam to become smaller.

Figure 5:
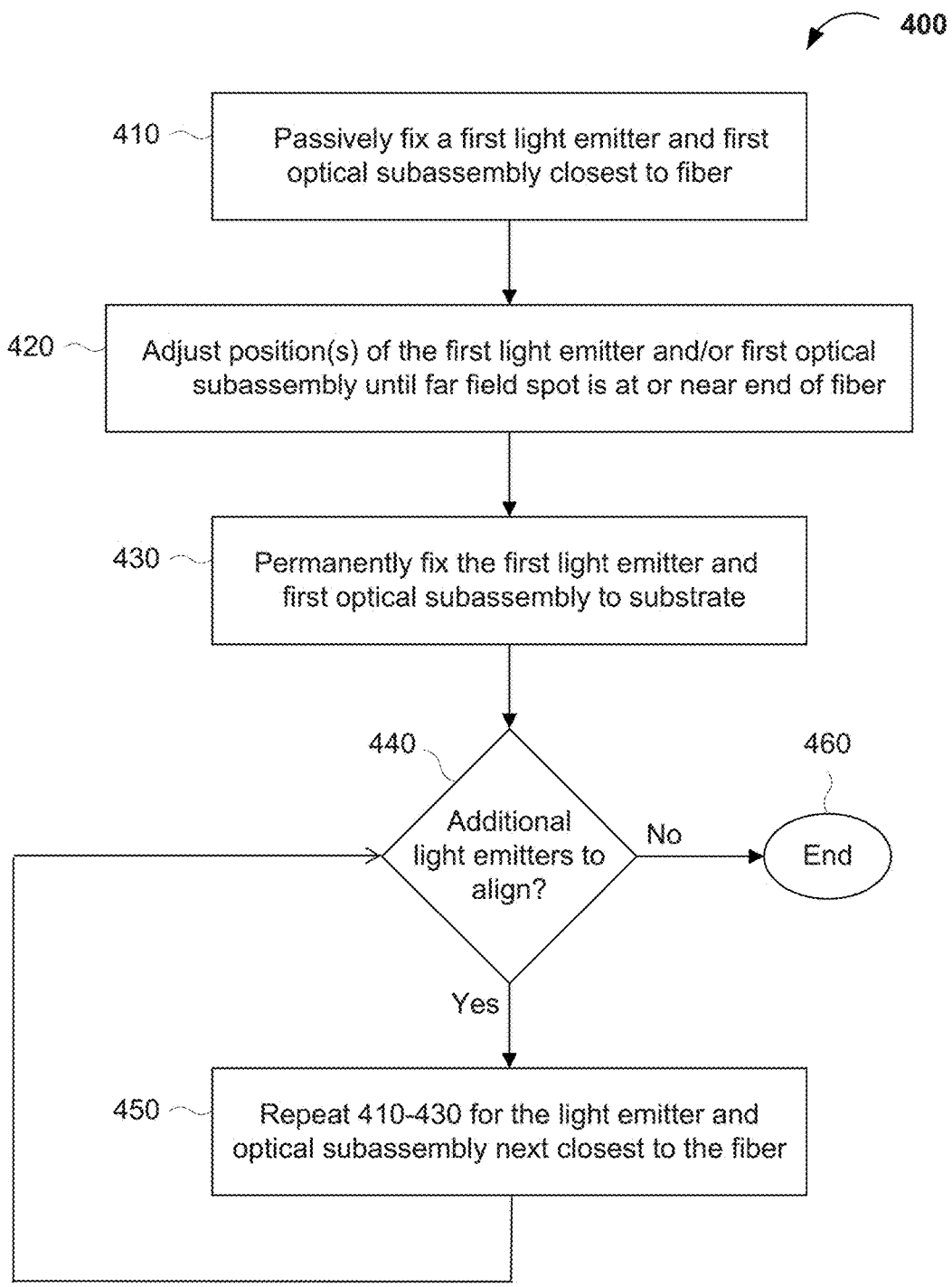
FIG. 5 is a flow chart showing more detailed steps in an exemplary method of making an optoelectronic transmitter in accordance with some embodiments of the present invention.

FIG. 5 shows a flow chart 400 illustrating further details of an exemplary method of making an optoelectronic transmitter (e.g., the optoelectronic transmitter 100 of FIG. 1A) in accordance with embodiments of the present invention. In particular embodiments, different "modes" of lens, mirror, and filter placement and alignment can be supported. For example, the first mode may represent a 40G-compliant optoelectronic transmitter, such as shown in the examples of FIGS. 1 and 4, and the second mode may represent a 100G-compliant optoelectronic transmitter, such as shown in the example of FIG. 2. Thus, the modes may represent different end applications or optoelectronic structures. Alternatively, the modes may represent different ways of implementing steps in the method of aligning passive optical components in a multi-channel optical or optoelectronic transmitter.

At 410, a first light emitter and a first optical subassembly closest to the optical fiber are passively fixed to the substrate in predetermined locations. In one example, a lens-and-filter mount can be passively fixed on the substrate at a first predetermined location. Alternatively, a plurality of lens-and-filter mounts (e.g., 155, 165 and 175) can be fixed on the substrate or optical platform 192, and the corresponding lenses and filters mounted thereon. More advantageously, the optical subassemblies (e.g., 150, 160 and 170) including the lens-and-filter mounts may be preassembled, and the subassemblies may be passively fixed on the platform 192 one at a time (e.g., as part of a serial alignment process) or substantially at the same time (e.g., before any alignment process is initiated).

At 420, positions of the first subassembly (if preassembled) or of the lenses and filters (e.g., if individual lenses and filters are mounted on the lens-and-filter mount in the first subassembly) and the first light emitter can be adjusted. For example, and as discussed above, adjustments to the positions of the optical components can be made until a far field spot of the light from the first light emitter 136 is at or near an end of the optical fiber that is coupled at connector 120. At 430, when the first subassembly and the first light emitter are aligned (e.g., the far field spot of the light from the first light emitter 136 is at or near the end of the optical fiber), then the first subassembly and the first light emitter are permanently fixed to the substrate. For example, the first subassembly and the first light emitter may be permanently fixed to the substrate by irradiation with ultraviolet light (e.g., when the first subassembly and the first light emitter are passively fixed to the substrate using a UV-sensitive adhesive).

At 440, it is determined whether there are additional light emitters to align. If all light emitters have been aligned, then the method stops at 460. However, if light emitter(s) for additional channels need to be aligned, the method proceeds to 450, where steps 410-430 are repeated for the optical subassembly next closest to the optical fiber.

For example, referring to FIG. 1A, after the first subassembly 170 (and optionally the first light emitter 136) is aligned and fixed to the substrate 192, a second subassembly 160 and second light emitter 134 are aligned with the far field spot in the optical fiber connected to connector 120 as described above. Typically, the first subassembly 170 is already aligned and permanently fixed to the substrate 192, but if not, the first subassembly 170 (or components thereof) may be further aligned to improve the alignment of the far field spot from each of light emitters 136 and 134 prior to permanently fixing the first subassembly 170 to the substrate 192. Thereafter, the third and fourth optical subassemblies 150 and 140 (or components thereof) are aligned and fixed to the substrate 192, in substantially the same way. When all of the light emitters are aligned, the method stops at 460.

Figure 6:
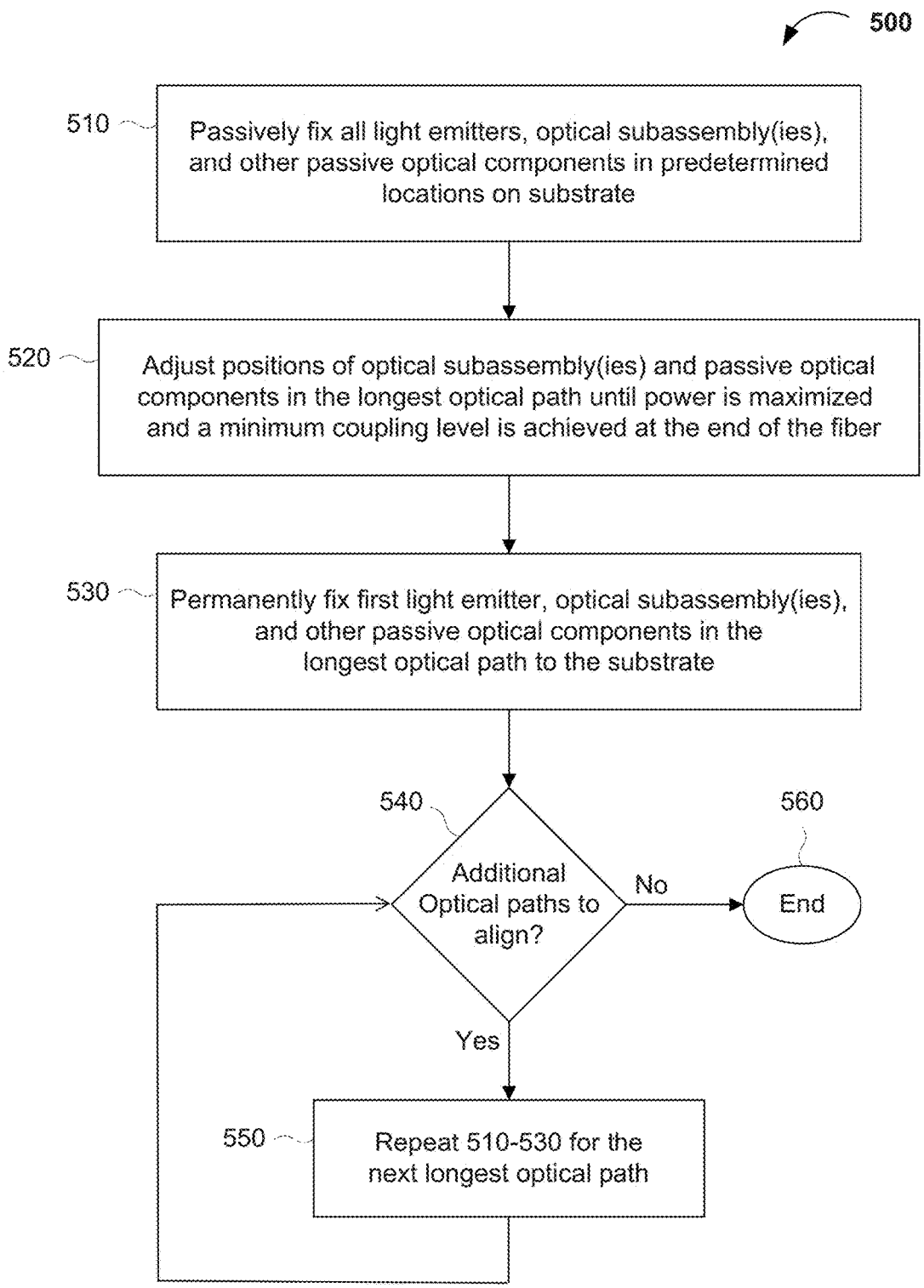
FIG. 6 is a flow chart showing more detailed steps in an exemplary method of making an optoelectronic transmitter in accordance with other embodiments of the present invention.

FIG. 6 shows a flow chart 500 illustrating further details of another exemplary method of making an optoelectronic transmitter (e.g., the optoelectronic transmitter 200 of FIG. 2) in accordance with embodiments of the present invention. The mode shown in FIG. 6 may represent a method of making a 100G-compliant optoelectronic transmitter, such as shown in the example of FIG. 2.

At 510, a plurality of light emitters, one or more optical subassemblies, and a plurality of other passive optical components (e.g., lenses, filters/beam splitters, and mirror[s]) can be placed on a substrate at predetermined locations. For example, as shown in FIG. 2, optical subassembly 235, isolator subassemblies 252 and 254, lenses 220, 222, 224 and 226, filters (e.g., polarization beam splitters) 230 and 232, and mirror 240 can be placed on the substrate 292. In the context of the present disclosure, a polarization beam splitter or functionally identical or similar device can be considered to be a filter because it can separate (or combine) different light beams having different polarization types. As described above, an optical subassembly 235 comprising a PBC 234 and a mirror 242 on a rhombic glass substrate can be fixed on the substrate 292 at a predetermined location, for example in front of and adjacent to the lens holder 270 in front of the connector for the optical fiber. The optical subassembly 235 can be made by depositing a thin reflective film (e.g., aluminum) onto a first surface of a rhombic glass substrate having angles between adjacent sides of 45° and 135°, and gluing a surface of a three-dimensional prism configured to reflect light having a first polarization type and pass through light having a second polarization type to an opposite surface of the rhombic glass substrate.

At 520, positions of the optical subassembly(ies) and remaining passive optical components (e.g., lenses, filters, mirror[s], and isolator) in the longest optical path can be adjusted until the power at a predetermined point or location in the fiber is maximized and a minimum threshold coupling level is achieved. Also, as discussed above, adjustments to the positions of the optical components can be made such that a far field spot of the light from each of light emitters is at or near an end of the optical fiber coupled to the connector. When the predetermined and/or desired results are achieved, the optical subassembly(ies) and other passive optical components in the longest optical path can be permanently fixed to the substrate as described herein at 530.

At 540, it is determined whether there are additional light emitters to align. If all light emitters have been aligned, then the method stops at 560. However, if light emitter(s) for additional channels need to be aligned, the method proceeds to 550, where steps 510-530 are repeated for the next longest optical path (i.e., the path that light travels from the light emitter to the nearest end of the fiber).

For example, referring to FIG. 2, after the optical subassembly 235, isolator 254, beam splitter 232, mirror 240, lens 226, and optionally, the first light emitter 216 are aligned and fixed to the substrate 292, components in the second optical path (isolator 252, beam splitter 230, and lens 224) and the second light emitter 214 are aligned with the optical fiber as described above and fixed to the substrate. The alignment process is then repeated for the components in the two remaining optical paths (i.e., lens 220 and light emitter 210 in the third optical path, and lens 222 and light emitter 212 in the fourth optical path). Alternatively, if the various optical components in a given optical path are already aligned but not yet permanently fixed to the substrate 292, the components in the given optical path may be further aligned after alignment of components in a subsequent optical path to improve the alignment of light from each of the light emitters prior to permanently fixing the optical components to the substrate 292. When light beams from all of the light emitters are aligned, the method stops at 560.

CONCLUSION(S)

Embodiments of the present invention advantageously provide optimal alignment in a free space, multichannel optical transmitter, and an optical transmitter with a reduced package size. The present invention further relates to a free space, multichannel optical transmitter (which may transmit collimated light or light signals), and methods for aligning optical components in such an optical or optoelectronic transmitter (e.g., an optical signal transmitter or transceiver, such as a transceiver for a fiber optic network).

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of aligning components in a multichannel optical or optoelectronic transmitter, the method comprising:
   a) passively fixing a plurality of light emitters in place on a substrate;
   b) passively fixing one or more optical subassemblies in predetermined locations on the substrate by a process comprising applying an adhesive to the one or more subassemblies and/or the substrate and contacting the one or more subassemblies to the substrate, wherein each optical subassembly (i) receives light from at least two of the plurality of light emitters, and (ii) comprises a plurality of passive optical components;
   c) passively fixing one or more additional passive optical components in predetermined locations on the substrate;
   d) adjusting a position and/or angle of a first one of the one or more optical subassemblies and any additional passive optical components through which light passes from a first one of the plurality of light emitters until a far field spot of the light from the first one of the plurality of light emitters is at or near an end of the optical signal transmission medium;
   e) adjusting positions of any remaining ones of the one or more optical subassemblies and the one or more additional passive optical components to align the light from the remaining one(s) of the plurality of light emitters with the far field spot; and
   f) after adjusting the positions of the one or more optical subassemblies, curing the adhesive.

2. The method of claim 1, wherein the substrate comprises a circuit board or optical platform, and passively fixing the plurality of light emitters comprises adhering the plurality of light emitters onto the circuit board or optical platform in predetermined locations.

3. A method of aligning components in a multichannel optical or optoelectronic transmitter, the method comprising:
   a) passively fixing a plurality of light emitters in place on a substrate;
   b) passively fixing one or more optical subassemblies in predetermined locations on the substrate, wherein each optical subassembly (i) receives light from at least two of the plurality of light emitters, and (ii) comprises a plurality of passive optical components;
   c) passively fixing a plurality of lenses, a plurality of filters, and a plurality of mirrors in predetermined locations on the substrate;
   d) adjusting a position and/or angle of a first one of the one or more optical subassemblies and any of the filters, the mirrors and the lenses through which light passes from a first one of the plurality of light emitters until a far field spot of the light from the first one of the plurality of light emitters is at or near an end of the optical signal transmission medium; and
   e) adjusting positions of any remaining ones of the one or more optical subassemblies and the remaining ones of the filters, the mirrors and the lenses to align the light from the remaining one(s) of the plurality of light emitters with the far field spot.

4. The method of claim 3, wherein passively fixing the one or more subassemblies on the substrate comprises applying an adhesive to the one or more subassemblies and/or the substrate and contacting the one or more subassemblies to the substrate, and the method further comprises curing the adhesive after adjusting the positions of the one or more optical subassemblies.

5. A method of aligning components in a multichannel optical or optoelectronic transmitter, the method comprising:
   a) passively fixing a plurality of light emitters in place on a substrate;
   b) passively fixing a plurality of optical subassemblies in predetermined locations on the substrate, wherein each optical subassembly (i) receives light from at least two of the plurality of light emitters, and (ii) includes a corresponding lens, a corresponding filter, and a lens-and-filter mount on which the corresponding lens and the corresponding filter are mounted or fixed
   c) passively fixing one or more additional passive optical components in predetermined locations on the substrate;
   d) adjusting a position and/or angle of a first one of the one or more optical subassemblies and any additional passive optical components through which light passes from a first one of the plurality of light emitters until a far field spot of the light from the first one of the plurality of light emitters is at or near an end of the optical signal transmission medium; and e) adjusting positions of any remaining ones of the one or more optical subassemblies and the one or more additional passive optical components to align the light from the remaining one(s) of the plurality of light emitters with the far field spot.

6. The method of claim 5, wherein the lens-and-filter mount comprises a flat metal piece on which the corresponding lens and the corresponding filter are directly or indirectly placed, and adjusting positions of the optical subassemblies further comprises adjusting a position of the lens-and-filter mount.

7. The method of claim 6, further comprising depositing or applying an adhesion-promoting plating on the lens-and-filter mount before passively fixing the one or more subassemblies on the substrate.

8. The method of claim 1, further comprising clamping the one or more optical subassemblies to the substrate during or after passively fixing the one or more subassemblies on the substrate.

9. The method of claim 3, wherein each of the plurality of filters reflects light having a first polarization type and allows light having a second polarization type to pass through.

10. The method of claim 3, wherein the one or more optical subassemblies comprises a mirror and a polarization beam combiner.

11. A multichannel optical or optoelectronic transmitter, comprising:
a) a plurality of light emitters;
b) at least one lens that focuses light from a unique one of the plurality of light emitters;
c) a plurality of optical subassemblies, each optical subassembly comprising:
i) a lens configured to focus light from a unique one of the light emitters,
ii) a filter configured to combine light from at least two of the light emitters by reflecting light having a first polarization type or wavelength and allowing light having a second polarization type or wavelength to pass through, and
iii) a lens-and-filter mount on which the lens and the filter are fixed or mounted; and
d) an output lens, filter, isolator and/or collimator receiving light from each of the light emitters, after passing through the one or more optical subassemblies,
wherein each of the subassemblies is configured to permit alignment of the light from each of the light emitters with a common far field spot location.

12. The method of claim 1, comprising passively fixing a plurality of optical subassemblies on the substrate, wherein each optical subassembly includes a corresponding lens, a corresponding filter, and a lens-and-filter mount on which the corresponding lens and the corresponding filter are mounted or fixed.

13. The transmitter of claim 11, wherein each of the lens-and-filter mounts comprises a flat sub-mount and a plurality of vertical or substantially vertical projections therefrom configured to secure the lens and provide a mounting surface for the filter.

14. The transmitter of claim 13, wherein the flat sub-mount comprises a flat metal piece having at least one dimension (i) substantially equal to a width of the lens and a width of each of a first two of the plurality of substantially vertical projections on opposed sides of the lens and/or (ii) greater than a width of the filter and less than the width of the filter and a width of each of a second two of the plurality of substantially vertical projections at opposed sides of the filter.

15. The method of claim 1, wherein the one or more additional passive optical components comprise a plurality of lenses, a plurality of filters, and a plurality of mirrors, and the method further comprises adjusting positions of the filters, mirrors and lenses to align the light from the plurality of light emitters with the far field spot.

16. The transmitter of claim 11, wherein the lens and the filter are at an angle of about 45° with respect to each other, a first one of the plurality of light emitters and a corresponding first lens are linearly aligned (or aligned at a 180° angle) with the common far field spot location, the plurality of light emitters consists of n light emitters, the plurality of subassemblies consists of n−1 subassemblies, and n is an integer of at least 3.

17. A multichannel optical or optoelectronic transmitter, comprising:
a) a plurality of light emitters, consisting of n light emitters and n corresponding focusing lenses, wherein each of the n light emitters emits polarized and/or collimated light, a first one of the plurality of light emitters and a corresponding first one of the focusing lenses are linearly aligned (or aligned at a 180° angle) with the common far field spot location, and n is an integer of at least 4;
b) one or more optical subassemblies, each optical subassembly comprising:
i) a first optical component configured to focus or reflect light from at least one of the light emitters,
ii) a second optical component filter configured to combine light from at least two of the light emitters, and
iii) a structural support on which the first and second optical components are deposited, fixed or mounted,
wherein one of the one or more optical subassemblies comprises a first mirror and a polarization beam combiner:
c) one or more second mirrors;
d) a plurality of polarization beam splitters, receiving light from first and second ones of the plurality of light emitters through the corresponding focusing lenses and light from third and fourth ones of the plurality of light emitters reflected by the one or more second mirrors;
e) a plurality of isolators receiving light from the plurality of polarization beam splitters;
f) a first waveplate on a first one of the plurality of isolators, the first waveplate rotating light from a first one of the plurality of polarization beam splitters in a first direction;
g) a second waveplate on a second one of the plurality of isolators, the second waveplate rotating light from a second one of the plurality of polarization beam splitters in a second direction opposite to the first direction; and
h) an output lens, filter, isolator and/or collimator receiving light from each of the light emitters, after passing through the one or more optical subassemblies,
wherein each of the optical subassemblies is configured to permit alignment of the light from each of the light emitters with a common far field spot location.

18. The transmitter of claim 17, wherein each isolator is oriented at an angle between 0° and 22.5° relative to the light from a corresponding one of the polarization beam splitters.

19. The transmitter of claim 18, wherein:
a) the first waveplate comprises a first quarter waveplate and a first half waveplate that rotates the light from a first one of the polarization beam splitters by either 0° or 90°; and
b) the second waveplate comprises a second quarter waveplate and a second half waveplate that rotates the light from a second one of the polarization beam splitters by the other of 0° and 90°.

20. The transmitter of claim 11, wherein the plurality of light emitters consists of n light emitters and n corresponding focusing lenses, each of the n light emitters emits polarized and/or collimated light, a first one of the plurality of light emitters and a corresponding first lens are linearly aligned (or aligned at a 180° angle) with the common far field spot location, one of the one or more subassemblies comprises a mirror and a polarization beam combiner, and n is an integer of at least 3.

21. The transmitter of claim 11, further comprising a connector configured to receive an optical fiber, and the common far field spot location is at or near an end of the optical fiber in the connector.

\* \* \* \* \*